United States Patent
Li et al.

(10) Patent No.: US 12,159,377 B2
(45) Date of Patent: Dec. 3, 2024

(54) IMAGE PROCESSING METHOD AND APPARATUS, VIDEO PROCESSING METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Benchao Li, Shenzhen (CN); Feng Li, Shenzhen (CN); Qifeng Chen, Shenzhen (CN); Chenghao Liu, Shenzhen (CN); Yi Liu, Shenzhen (CN); Juanhui Tu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 381 days.

(21) Appl. No.: 17/572,631

(22) Filed: Jan. 11, 2022

(65) Prior Publication Data

US 2022/0130020 A1 Apr. 28, 2022

Related U.S. Application Data

(63) Continuation of application No. PCT/CN2020/105018, filed on Jul. 28, 2020.

(30) Foreign Application Priority Data

Dec. 23, 2019 (CN) .......................... 201911338778.2

(51) Int. Cl.
*G06T 5/70* (2024.01)
*G06T 5/20* (2006.01)
(Continued)

(52) U.S. Cl.
CPC .................. *G06T 5/70* (2024.01); *G06T 5/20* (2013.01); *G06T 5/50* (2013.01); *G06T 11/203* (2013.01);
(Continued)

(58) Field of Classification Search
CPC .... G06T 5/20; G06T 5/50; G06T 5/70; G06T 5/73; G06T 11/203; G06T 2207/10016; G06T 2207/10024; G06T 2207/30201
See application file for complete search history.

(56) References Cited

U.S. PATENT DOCUMENTS 8,831,314 B1 9/2014 Fonte et al.
10,944,805 B1* 3/2021 Zhong .................... H04N 7/147
(Continued)

FOREIGN PATENT DOCUMENTS

CN 104574306 A * 4/2015
CN 105956993 A 9/2016
(Continued)

OTHER PUBLICATIONS

Machine translation of CN106228516 (Year: 2016).*
(Continued)

*Primary Examiner* — Katrina R Fujita
(74) *Attorney, Agent, or Firm* — ANOVA LAW GROUP PLLC

(57) ABSTRACT

An image processing method includes: obtaining a target image; performing blurring processing on an original image of a specified channel of channels of the target image to obtain a first blurred image; performing high pass processing on the original image of the specified channel and the first blurred image to obtain a high pass image; obtaining, for a channel, a second blurred image corresponding to the channel based on an original image of the channel and the high pass image; and obtaining a processed image corresponding
(Continued)

to the target image based on the second blurred image of the channel and the high pass image.

18 Claims, 6 Drawing Sheets

(51) Int. Cl.
    *G06T 5/50*     (2006.01)
    *G06T 11/20*     (2006.01)

(52) U.S. Cl.
    CPC .............. *G06T 2207/10016* (2013.01); *G06T 2207/10024* (2013.01); *G06T 2207/30201* (2013.01)

(56) References Cited

U.S. PATENT DOCUMENTS

| | | | | |
|---|---|---|---|---|
| 10,992,845 | B1* | 4/2021 | Seely | G06T 5/20 |
| 2006/0268101 | A1* | 11/2006 | He | H04N 7/147 |
| | | | | 348/14.07 |
| 2014/0176548 | A1* | 6/2014 | Green | G06T 7/251 |
| | | | | 382/199 |
| 2014/0369554 | A1* | 12/2014 | Albuz | G06T 5/70 |
| | | | | 382/103 |
| 2016/0086355 | A1* | 3/2016 | Zhang | G06T 5/70 |
| | | | | 348/223.1 |
| 2019/0185742 | A1 | 6/2019 | Widger et al. | |
| 2020/0410211 | A1* | 12/2020 | Lai | G06V 10/443 |

FOREIGN PATENT DOCUMENTS

| | | | | | |
|---|---|---|---|---|---|
| CN | 106228516 | A | | 12/2016 | |
| CN | 106355565 | A | | 1/2017 | |
| CN | 106447606 | A | | 2/2017 | |
| CN | 106921840 | A | * | 7/2017 | |
| CN | 107194869 | A | | 9/2017 | |
| CN | 108428215 | A | * | 8/2018 | G06T 5/002 |
| CN | 108629730 | A | | 10/2018 | |
| CN | 109035158 | A | | 12/2018 | |
| CN | 109377454 | A | | 2/2019 | |
| CN | 110248242 | A | | 9/2019 | |
| CN | 110599410 | A | * | 12/2019 | G06T 5/002 |
| CN | 111028180 | A | | 4/2020 | |
| IN | 105046661 | A | | 11/2015 | |

OTHER PUBLICATIONS

The State Intellectual Property Office of the People's Republic of China (SIPO) Office Action 1 for for 201911338778.2 Mar. 24, 2021 11 Pages (including translation).
The World Intellectual Property Organization (WIPO) International Search Report for PCT/CN2020/105018 Oct. 30, 2020 6 Pages (including translation).

* cited by examiner

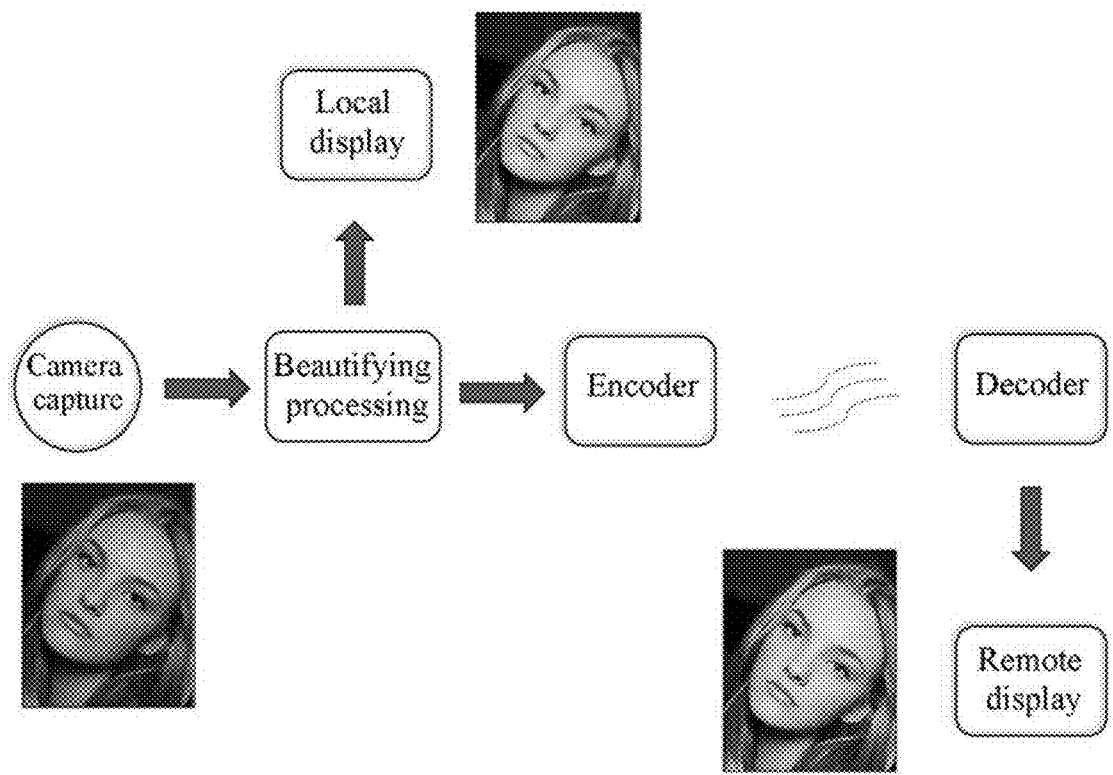
FIG. 4
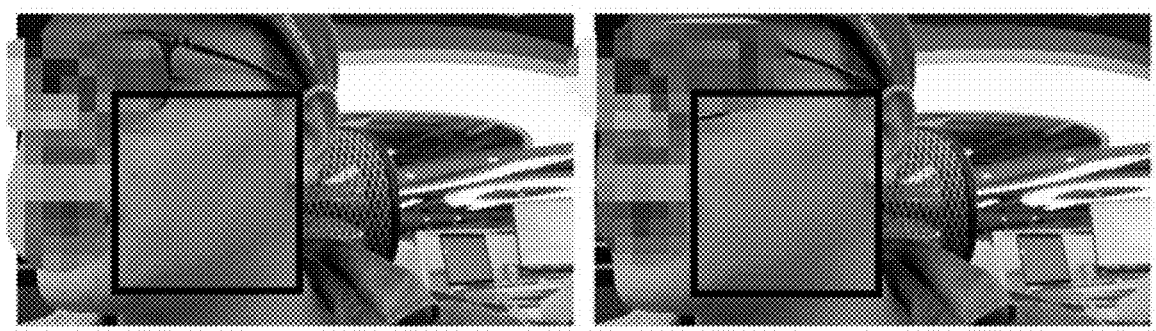
FIG. 5A   FIG. 5B
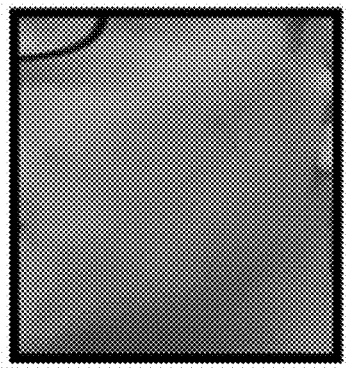 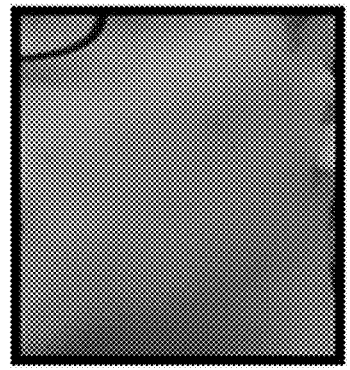
FIG. 6A   FIG. 6B

IMAGE PROCESSING METHOD AND APPARATUS, VIDEO PROCESSING METHOD AND APPARATUS, ELECTRONIC DEVICE, AND STORAGE MEDIUM

CROSS-REFERENCES TO RELATED APPLICATIONS

This application is a continuation application of PCT Patent Application No. PCT/CN2020/105018, filed on Jul. 28, 2020, which claims priority to Chinese Patent Application No. 201911338778.2, entitled "IMAGE PROCESSING METHOD, VIDEO PROCESSING METHOD, AND CORRESPONDING APPARATUSES" and filed with the China National Intellectual Property Administration on Dec. 23, 2019, the entire contents of both of which are incorporated herein by reference.

FIELD OF THE TECHNOLOGY

The present disclosure relates to the field of computer technologies, and specifically, to an image processing method and apparatus, a video processing method and apparatus, an electronic device, and a storage medium.

BACKGROUND OF THE DISCLOSURE

With the rise of the Internet, an image beautifying function has become an essential function of many social applications on both a desktop terminal and a mobile terminal. Although image beautifying is usually not a core function of these applications, the beautifying function can meet a specific requirement of a user in a specific scenario, thereby improving user experience of the user.

However, an existing image beautifying algorithm is usually of high complexity, resulting in high CPU usage during running of the algorithm.

SUMMARY

The objective of the present disclosure is to resolve at least one of the foregoing technical defects, and the technical solutions provided in embodiments of the present disclosure are as follows:

According to one aspect, an embodiment of the present disclosure provides an image processing method, including: obtaining a target image; performing blurring processing on an original image of a specified channel of channels of the target image to obtain a first blurred image; performing high pass processing on the original image of the specified channel and the first blurred image to obtain a high pass image; obtaining, for a channel, a second blurred image corresponding to the channel based on an original image of the channel and the high pass image; and obtaining a processed image corresponding to the target image based on the second blurred image of the channel and the high pass image.

According to another aspect, an embodiment of the present disclosure provides an image processing apparatus, including: an image obtaining module, configured to obtain a target image; a first blurred image obtaining module, configured to perform blurring on an original image of a specified channel of channels of the target image to obtain a first blurred image; a high pass image obtaining module, configured to perform high pass processing on the original image of the specified channel and the first blurred image to obtain a high pass image; a second blurred image obtaining module, configured to obtain, for a channel, a second blurred image corresponding to the channel based on an original image of the channel and the high pass image; and a beautifying processing module, configured to obtain a processed image corresponding to the target image based on the second blurred image of the channel and the high pass image.

According to another aspect, an embodiment of the present disclosure provides an electronic device, including a memory and a processor, the memory storing a computer program; and the processor being configured to execute the computer program to implement: obtaining a target image; performing blurring processing on an original image of a specified channel of channels of the target image to obtain a first blurred image; performing high pass processing on the original image of the specified channel and the first blurred image to obtain a high pass image; obtaining, for a channel, a second blurred image corresponding to the channel based on an original image of the channel and the high pass image; and obtaining a processed image corresponding to the target image based on the second blurred image of the channel and the high pass image.

According to another aspect, an embodiment of the present disclosure provides a non-transitory computer-readable storage medium, storing a computer program, the computer program, when executed by a processor, implementing the methods according to the foregoing method embodiments.

BRIEF DESCRIPTION OF THE DRAWINGS

To describe the technical solutions in the embodiments of the present disclosure more clearly, the following briefly introduces the accompanying drawings required for describing the embodiments of the present disclosure.

FIG. 4 is an example of video beautifying processing in a video conferencing using a PC as a local terminal device in an embodiment of the present disclosure.

FIG. 5A is an original image in an example of an embodiment of the present disclosure.

FIG. 5B is a beautified image corresponding to the original image in FIG. 5A.

FIG. 6A is an enlarged image of a region within a box of the original image in FIG. 5A.

FIG. 6B is an enlarged image of a region within a box of the beautified image in FIG. 5B.

DESCRIPTION OF EMBODIMENTS

Figure 1A:
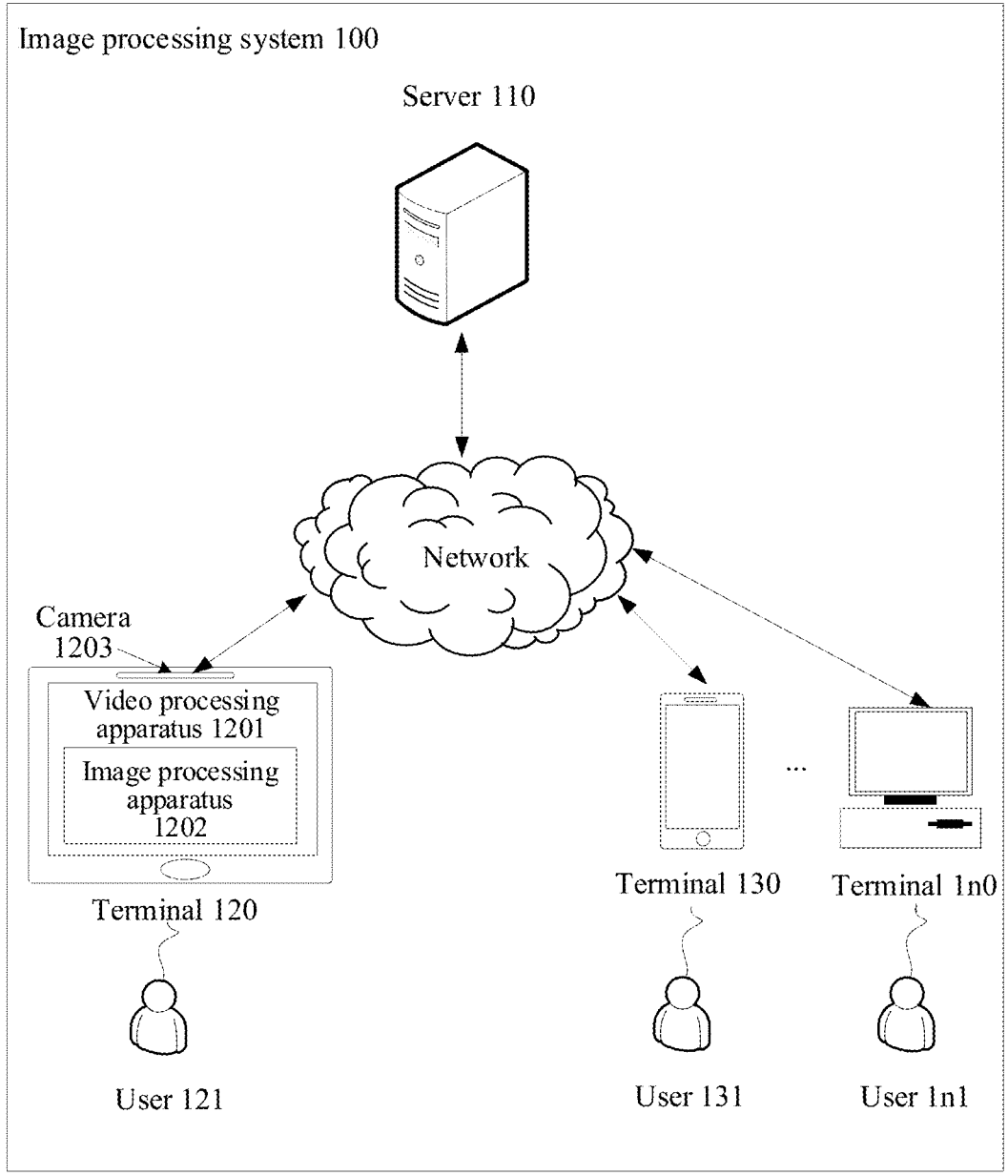
FIG. 1A is a schematic structural diagram of an image processing system according to an embodiment of the present disclosure.

The following describes embodiments of the present disclosure in detail. Examples of the embodiments are shown in the accompanying drawings, and same or similar reference signs in all the accompanying drawings indicate same or similar components or components having same or similar functions. The embodiments that are described below with reference to the accompany drawings are exemplary, and are only used to interpret the present disclosure and cannot be construed as a limitation to the present disclosure.

A person skilled in the art may understand that, the singular forms "a", "an", "said", and "the" used herein may include the plural forms as well, unless the context clearly indicates otherwise. It is to be further understood that, the terms "include" and/or "comprise" used in this specification of the present disclosure refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to another element, or an intermediate element may exist. In addition, the "connection" or "coupling" used herein may include a wireless connection or a wireless coupling. The term "and/or" used herein includes all of or any of units and all combinations of one or more related listed items.

To make objectives, technical solutions, and advantages of the present disclosure clearer, the following further describes implementations of the present disclosure in detail with reference to the accompanying drawings.

First, several terms included in the present disclosure are described and explained.

DirectX: DirectX (Direct eXtension, DX) is a series of application program interfaces developed specifically for multimedia and games.

Metal: is a low-level rendering application program interface, providing a lowest level required by software to ensure that the software can run on different graphics chips.

GPU: graphics processing unit, also known as a display core, a visual processor, a display chip, is a microprocessor specifically for performing image and graphics-related computing work on a personal computer (PC), a workstation, a game console, and some mobile devices (such as a tablet computer and a smartphone).

CPU: central processing unit, is one of main devices of a computer, and its function is mainly to interpret computer instructions and process data in computer software. Programmability of a computer mainly refers to programming for a CPU.

With the rise of the Internet, an image beautifying function has become an essential function of many social applications on both a desktop terminal and a mobile terminal. Although image beautifying is usually not a core function of these applications, the beautifying function can meet a specific requirement of a user in a specific scenario, thereby improving user experience of the user. However, in an existing image beautifying algorithm, format conversion usually needs to be performed on an image during beautifying processing of the image, and the algorithm is of high complexity, resulting in high CPU usage during running of the algorithm.

Figure 1B:
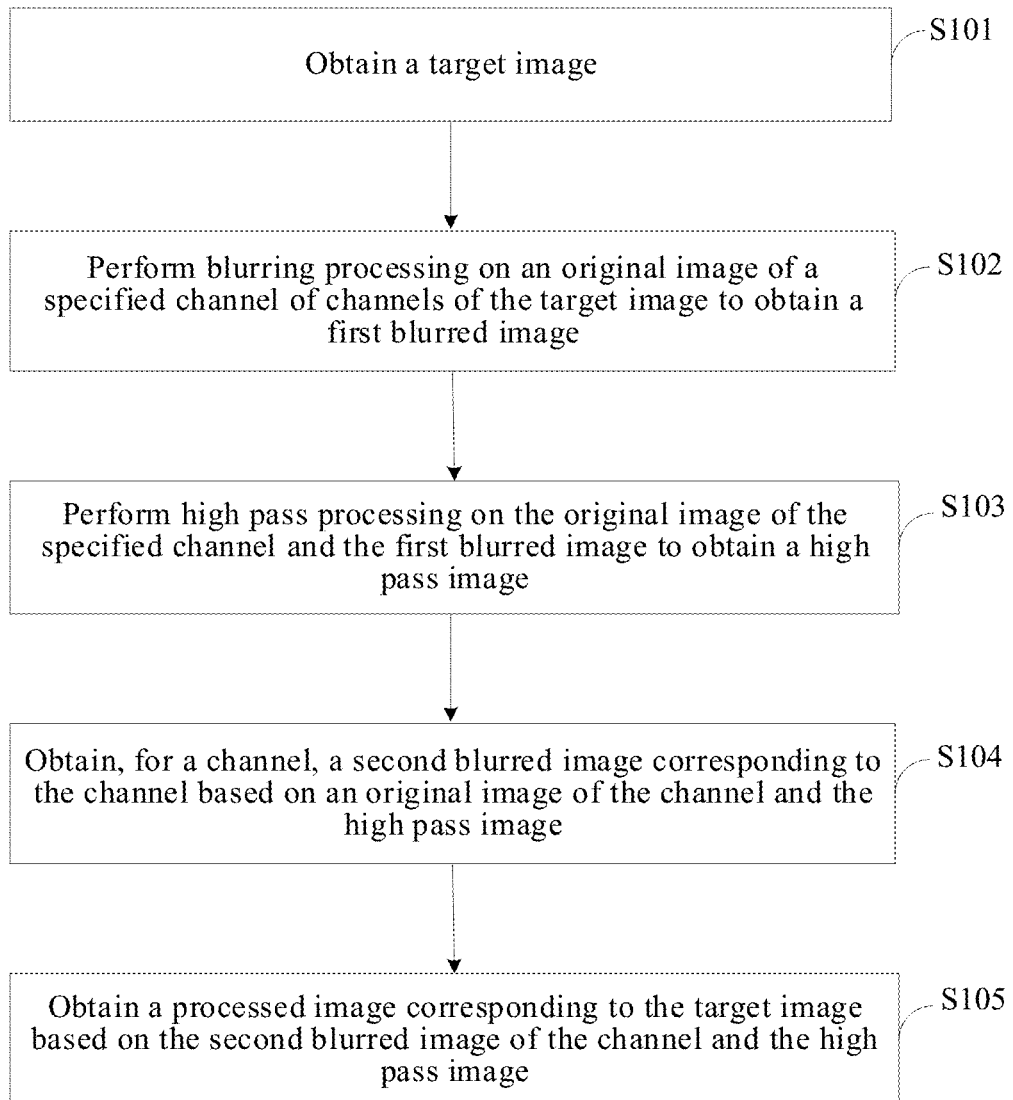
FIG. 1B is a flowchart of an image processing method according to an embodiment of the present disclosure.

FIG. 1A is a schematic structural diagram of an image processing system according to an embodiment of the present disclosure. As shown in FIG. 1B, the image processing system 100 can support a remote video conference, and includes a server 110 and a terminal 120 as local terminals, and a terminal 130 . . . , and a terminal 1n0 as remote terminals, where n is a positive integer greater than 3.

A camera 1203 is installed in the terminal 120 as a video capture device, and in response to an operation of a user 121, a video captured by the camera 1203 is outputted to a video processing apparatus 1201. The video processing apparatus 1201 includes an image processing apparatus 1202, and according to an image processing method in the embodiments of the present disclosure, for any one or more frames of images in the video, the image processing apparatus 1202 processes at least one frame of the image to be beautified. The video processing apparatus 1201 combines processed frames of images to generate a beautified video, encodes the beautified video, and then sends the encoded beautified video to the server 110 through a wireless or wired network.

After receiving the encoded beautified video, the server 110 decodes the encoded beautified video by using a decoder, to obtain the beautified video, sends the video to the remote terminals 130 . . . , and 1n0 and displays the video to users 131 . . . , and 1n1.

In another embodiment of the present disclosure, the terminal 120 may alternatively send the captured video to the server 110, and the server 110 performs image processing and video processing, and sends a processed video to the remote terminals 130 . . . , and 1n0.

The server 110 may be a server, or a server cluster that includes several servers, or a cloud computing service center. The terminals 120, 130 . . . , and 1n0 may be smart terminals, including a smartphone, a tablet computer, a laptop computer, and the like.

The present disclosure provides an image processing method for the foregoing problem. FIG. 1B is a flowchart of an image processing method according to an embodiment of the present disclosure. The method is performed by an electronic device, for example, by the image processing apparatus 1201 in the terminal 110 shown in FIG. 1A, or by the server 110 shown in FIG. 1A. As shown in FIG. 1B, the method may include the following steps:

Step S101. Obtain a target image.

The target image may be an image of one or more faces on which beautifying processing needs to be performed, and the beautifying processing may be understood as removing "blemishes" (blemishes may be spots, acne marks, or the like) from a face. The target image generally includes a plurality of channels, and an original image of each channel includes some information of the target image. For example, for a target image including RGB channels, an original image of the R channel, an original image of the B channel, and an original image of the G channel include some information of the target image, and the original image of the G channel includes more information of the target image than the original image of the R channel and the original image of the B channel.

Specifically, in different application scenarios, the target image may be captured by various image capture devices. For example, in a video conference scenario, the target image may be captured by a camera on a device such as a mobile phone, a tablet, or a PC, and a face included in a captured target image may be a face of a participant. In addition, the target image may alternatively be an image including a face available in various image libraries.

Step S102. Perform blurring processing on an original image of a specified channel of channels of the target image to obtain a first blurred image.

High-frequency signals in the target image generally correspond to regions of a face with "blemishes" and regions such as facial features, and regions corresponding to the high-frequency signals have a fast grayscale change, while low-frequency signals generally correspond to regions of smooth skin in the face, and regions corresponding to the low-frequency signals have a slow grayscale change. The performing blurring processing on the target image may be understood as performing low-pass filtering on the target image, that is, removing high-frequency information from the target image, to remove the "blemishes" of the face. During specific implementation, a Gaussian Blur algorithm may be used to perform blurring processing on the target image.

Step S103. Perform high pass processing on the original image of the specified channel and the first blurred image to obtain a high pass image.

The high-frequency signals correspond not only to noise information such as the "blemishes" of the face, but also to useful information such as the facial features. Therefore, during the blurring processing process on the original image of the specified channel, both the noise information of the face and the useful information are removed. Because the original image of the specified channel includes both noise information and useful information, high pass processing may be performed based on the original image and the first blurred image to obtain a high pass image that retains useful information. The High pass image retains useful detail information such as facial features in the original image, and may be specifically embodied in that contour regions such as facial features have larger gray values, which means visually brighter, while other regions have smaller gray values, which means visually darker.

Specifically, because the original image of each channel of the target image includes information about the target image (and also includes the "blemishes" of the face in the target image), and generally the amount of information of the target image included in the original image of each channel varies. The original image of each channel is generally processed as in step S102 and step S103 to obtain the first blurred image and the high pass image corresponding to each channel, but a high pass image corresponding to one specified channel of to-be-processed channels may include most useful information of the target image. Therefore, in order to simplify a beautifying algorithm, one channel may be selected from the channels of the target image as a specified channel according to an actual requirement, the processing processes of step S102 and step S103 may be performed only on the specified channel, and the obtained high pass image may be used as the high pass image corresponding to each channel of the target image.

Step S104. Obtain, for a channel, a second blurred image corresponding to the channel based on an original image of the channel and the high pass image. In some embodiments, a second blurred image may be obtained for the channel of the original image.

Specifically, the high pass image is used as the high pass image of the channel of the target image, and the corresponding second blurred image is obtained based on the original image of the channel and the high pass image.

Step S105. Obtain a processed image corresponding to the target image based on the second blurred image of the channel and the high pass image. In some embodiments, the processed image may be obtained based on second blurred images of all channels and the high pass image.

Specifically, the blurred image of the channel may be added with the high pass image to obtain a beautified image with "blemishes" removed.

In the solution provided in this embodiment of the present disclosure, in the process of beautifying the target image, blurring processing and high pass processing are performed on the original image of the specified channel of a plurality of channels of the target image sequentially, a processed high pass image of the specified channel is used as the high pass image of all channels, and then a blurred image of all channels is obtained according to the high pass image. Because there is no image format conversion in the beautifying process in the solution, and blurring processing and high pass processing are performed on images of only one channel, the complexity of the beautifying processing is reduced, and the CPU usage of the beautifying processing is further reduced.

In one embodiment of the present disclosure, the performing blurring processing on an original image of a specified channel of channels of the target image to obtain a first blurred image includes:

for a pixel in the original image of the specified channel:
obtaining a first preset quantity of pixels within a region having a preset radius centered on the pixel, the first preset quantity being less than a quantity of pixels within the region; and obtaining a blurred pixel value corresponding to the pixel based on pixel values of the pixels of the first preset quantity; and obtaining the first blurred image according to the blurred pixel value corresponding to the pixel in the original image. In some embodiments, the process may be implemented for all pixels in the original image of the specified channel.

The processing process may be understood as a simplified Gaussian Blur process. In the conventional Gaussian Blur process, for a target pixel in the original image of the specified channel, in the process of updating the pixel value of the target pixel, the pixel values of all the pixels centered on the target pixel and within the preset radius are obtained. In order to reduce the computation of obtaining the first blurred image, to further simplify the beautifying processing process, and reduce the CPU usage in the beautifying processing process, in the solution of this embodiment of the present disclosure, the pixel values of all the pixels centered on the target pixel and within the preset radius are not obtained. Instead, the pixel values of the pixels of the first preset quantity are obtained. It may be understood that the specific value of the first preset quantity may be set according to an actual requirement.

Specifically, for a target pixel in the original image of the specified channel, after pixels of the first preset quantity corresponding to the target pixel are determined, the pixel values of the pixels of the first preset quantity may be weighted averaged and a pixel value of the target pixel may be updated with the weighted average. After the pixel value of the target pixel has undergone the updating process, the first blurred image corresponding to the specified channel is obtained.

In one embodiment of the present disclosure, the obtaining a first preset quantity of pixels includes: drawing a plurality of circles within the region, and obtaining a plurality of pixels symmetrically distributed on one or more of the plurality of circles, wherein a total quantity of pixels obtained from the one or more circles is the first preset quantity. A Cartesian coordinate system is established by using the pixel as the origin, and pixels symmetrically distributed in four quadrants are obtained.

For example, for a pixel in the specified channel, if the preset radius has 20 pixels, a quantity of corresponding pixels in a circular region centered on the pixel and with a radius of 20 pixels is approximately 784 (computed with the largest inscribed square of the circular region). In order to reduce the computation, only 20 (the first preset quantity) pixels are sampled in the solution of this embodiment of the present disclosure, that is, pixel values of only 20 pixels are obtained.

Figure 2A:
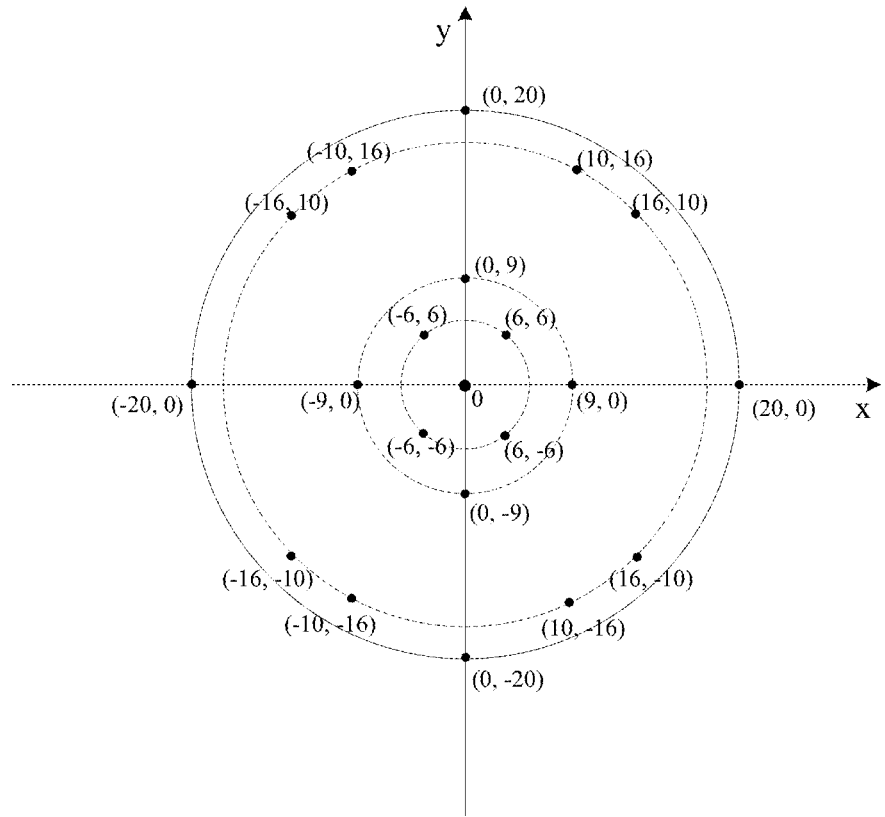
FIG. 2A is a schematic diagram of obtaining pixels according to an embodiment of the present disclosure.

Specifically, as shown in FIG. 2A, a Cartesian coordinate system with the pixel as the origin is established. In order to make the 20 obtained pixels include as much information as possible within the circular region 210, the 20 pixels include symmetrically distributed pixels obtained on each of four circumferences/circles 210, 211, 212, and 213 drawn within the circular region 210 centered on the pixel. The 20 pixels, corresponding to the four circumferences 210, 211, 212, 213 respectively, are: (0, −20), (20, 0), (0, 20), (−20, 0); (10, −16), (16, −10), (16, 10), (10, 16), (−10, 16), (−10, 16), (−16, 10), (−16, 10), (−16, −10), (−10, −16); (0, −9), (−9, 0), (0, 9), (9, 0); and (−6, −6), (−6, 6), (6, 6), and (6, −6). Similarly, it may be understood that the specific value of the second preset quantity may be set according to an actual requirement.

In one embodiment of the present disclosure, the performing high pass processing on the original image of the specified channel and the first blurred image to obtain a high pass image includes:
 obtaining an initial high pass image based on differences between pixel values of pixels in the original image of the specified channel and pixel values of corresponding pixels in the first blurred image; and
 performing at least one high pass filtering processing on the initial high pass image to obtain the high pass image.

Specifically, the initial high pass image may be obtained according to the following expression:

$$I_{hp}^{G}=I^{G}-I_{g}^{G}+0.5 \qquad (1),\text{ where}$$

$I_{hp}^{G}$ is the initial high pass image, $I^{G}$ is the original image of the specified channel, $I_{g}^{G}$ is the first blurred image of the specified channel, and 0.5 is an offset parameter. The offset parameter is set to prevent pixel values (gray values) of excessive pixels obtained by an operation $I^{G}-I_{g}^{G}$ from falling out of a valid range, to prevent causing an excessively dark image, thereby preventing loss of information.

The pixel values of the images in the foregoing expression are normalized to an interval from 0 to 1. It may be understood that if the foregoing operation is performed in a GPU, the foregoing normalization processing is required. If the foregoing operation is performed in a CPU, the foregoing normalization process is not required, and gray values are directly used as the pixel values of the pixels, and the offset parameter may also be 127 or 128.

Then, in order to further highlight high-frequency signals in the initial high pass image and suppress low-frequency signals, multiple high pass filtering may be performed on the initial high pass image. Each high pass filtering may be understood as performing high pass filtering on a pixel in the initial high pass image separately, and the pixel value of the pixels in the high pass image obtained through each high pass filtering may be obtained according to the following expression:

$$\begin{cases} \text{if } x \le 0.5, & x' = x*x*2.0 \\ \text{if } x > 0.5, & x' = 1-(1-x)*(1-x)*2.0 \end{cases} \qquad (2)$$

where
 x is the pixel value of the pixel in the initial high pass image, and x' is the pixel value of the pixel x after high pass filtering.

It may be understood that the frequency of high pass filtering on the initial high pass image and a specific filtering manner may be determined according to actual needs and will not be limited here.

In one embodiment of the present disclosure, the obtaining, for a channel, a second blurred image corresponding to the channel based on an original image of the channel and the high pass image includes:
 obtaining blurred image retention parameters based on the first blurred image, the blurred image retention parameters being used for representing information distribution corresponding to pixels in the first blurred image;
 obtaining a third blurred image corresponding to the channel based on differences between pixel values of pixels in the original image of the channel and pixel values of corresponding pixels in the high pass image; and
 obtaining the second blurred image based on the blurred image retention parameters and the third blurred image.

The blurred image retention parameters obtained based on the first blurred image may represent the information distribution corresponding to the pixels in the first blurred image. Then, in order to retain detail information in the first blurred image, the blurred image retention parameters may be added to the computation of the second blurred image for each channel.

Specifically, the high pass image of the specified channel is used as the high pass image of each channel of the target image, and because the original image of each channel may be understood as a sum of the high pass image of the channel and the blurred image, the blurred image corresponding to the channel, that is, the third blurred image corresponding to the channel, may be obtained by subtracting the pixel value of the corresponding pixel in the high pass image of the channel from the pixel values of the pixels in the original image of the channel. In order to retain more detail information and make the blurred image corresponding to each channel more accurate, the third blurred image corresponding to each channel may be multiplied by the blurred image retention parameters to obtain the second blurred image. The multiplying the third blurred image corresponding to each channel by the blurred image retention parameter means multiplying each pixel in the third blurred image corresponding to each channel by the blurred image retention parameter corresponding to the pixel.

In one embodiment of the present disclosure, the obtaining blurred image retention parameters based on the first blurred image includes: determining, for a pixel in the first blurred image, a blurred image retention parameter according to β power of a pixel value of the pixel in the first blurred image, β being an adjustment coefficient. For example, the obtaining blurred image retention parameters based on the first blurred image includes:
 determining the blurred image retention parameter according to the following expression:

$$I_{\alpha}=1.0+(I_{g}^{G})^{\beta}*\omega \qquad (3),\text{ where}$$

$I_{g}^{G}$ is a pixel value of a pixel in the first blurred image corresponding to the specified channel, $I_{\alpha}$ is blurred image retention parameters of the pixel, and β and ω are adjustment coefficients.

Specifically, values of β and ω may be obtained according to practical experience and is not limited herein. For example, β and ω may be 0.3 and 0.09 respectively.

In one embodiment of the present disclosure, the obtaining a processed image corresponding to the target image based on the second blurred image of the channel and the high pass image includes:

adding pixel values of the pixels in the second blurred image corresponding to channels of the target image to pixel values of corresponding pixels in the high pass image to obtain an added image; and performing weighted summation on pixel values of pixels in the added image and the pixel values of the corresponding pixels in the target image to obtain the processed image.

Specifically, the second blurred image corresponding to the channels of the target image is added with the high pass image to obtain a beautified image corresponding to the channels, and then weighted summation is performed on the beautified image corresponding to the channels and the image of the corresponding channel in the target image to obtain a beautified image. In order to control a beautifying degree, a beautifying degree parameter may be set, and the beautifying degree parameter determines the respective weights of the second blurred image and the target image during weighted summation.

In one embodiment of the present disclosure, the channels of the target image are red, green, and blue (RGB) channels, and the specified channel is a G (green) channel.

When the target image includes RGB channels, the G channel is selected as the specified channel because the G channel includes most abundant information. Then the foregoing process of adding pixel values of the pixels in the second blurred image corresponding to channels of the target image to pixel values of corresponding pixels in the high pass image to obtain an added image may be represented as the following expression:

$$I^{G'} \leftarrow I_\alpha * (I^G - I_{multi\text{-}add}^G) + I_{multi\text{-}add}^G$$

$$I^{R'} \leftarrow I_\alpha * (I^R - I_{multi\text{-}add}^G) + I_{multi\text{-}add}^G$$

$$I^{B'} \leftarrow I_\alpha * (I^B - I_{multi\text{-}add}^G) + I_{multi\text{-}add}^G$$

$$I_D = [I^{R'}, I^{G'}, I^{B'}] \quad (4), \text{ where}$$

$I_\alpha$ is blurred image retention parameters, $I_{multi\text{-}add}^G$ is a high pass image corresponding to the G channel, $I^R$, $I^G$, and $I^B$ are original images of the RGB channels respectively, $I_{R'}$, $I^{G'}$, and $I^{B'}$ are beautified images corresponding to the RGB channels, and $I_D$ is an obtained added image.

Further, weighted summation is performed on the obtained added image $I_D$ and the target image I, which is represented as the following expression:

$$I_s = (1-\gamma)I_D + \gamma I \quad (5), \text{ where}$$

$I_s$ is a beautified image, γ is a beautifying degree parameter, and the beautifying degree may be adjusted by adjusting the value of γ.

An office collaboration product has become an essential conference tool for more medium and large enterprises, and a remote video conferencing, as the most important part of functions of the office collaboration product, has a quite strict requirement for a video processing capability. In an actual video conference communication process, a user may need to beautify a video screen at some time. Although a beautifying algorithm is not a core function in the video conference, it is a high-end capability that can improve use experience of the video conference to meet a good requirement of the user in a specific occasion and at a specific time. However, in the beautifying algorithm for the video screen in the related art, during beautifying processing on a video image, format conversion usually needs to be performed on the image, making the existing beautifying algorithm for video images usually of high complexity, resulting in high CPU usage during running of the beautifying algorithm. When CPU resources are certain, a higher CPU usage of the beautifying algorithm indicates that fewer CPU resources are left for other functions in the video conference, and a larger more obstacle is caused to other functions in the video conference. An embodiment of the present disclosure provides a video processing method for the foregoing problem.

Figure 2B:
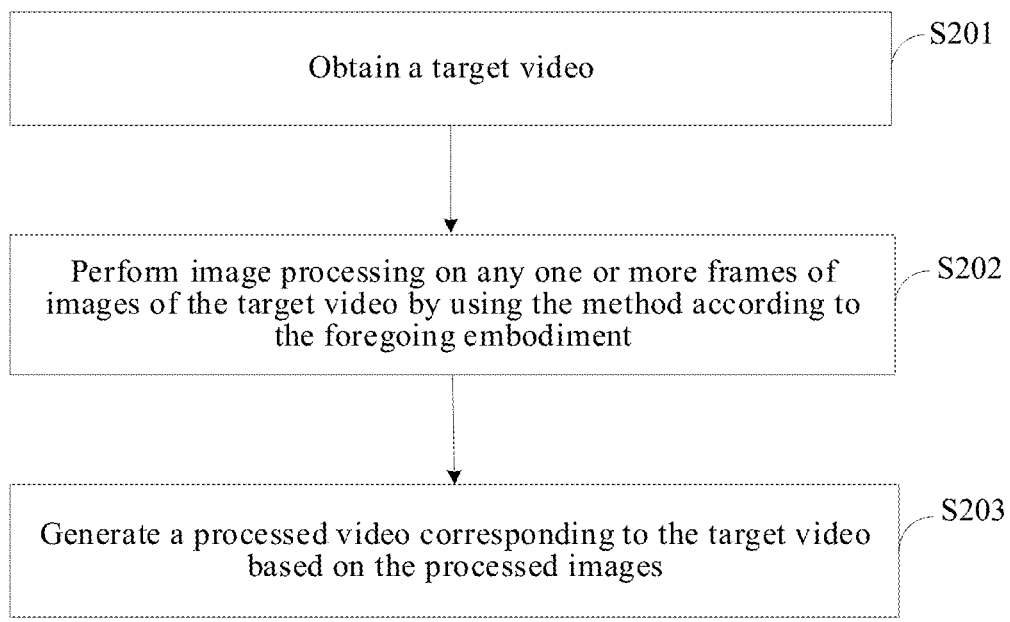
FIG. 2B is a flowchart of a video processing method according to an embodiment of the present disclosure.

FIG. 2B is a flowchart of a video processing method according to an embodiment of the present disclosure. An execution body of the method may be a terminal device, for example, the video processing apparatus 1201 in the terminal 120 shown in FIG. 1A, or a server, for example, the server 110 shown in FIG. 1A. As shown in FIG. 2B, the method may include the following steps:

Step S201. Obtain a target video.

Specifically, the target video may be captured by a video capture device, the target video may be understood as a combination of a plurality of frames of images, and performing beautifying processing on the target video is performing beautifying processing on the frames of images.

Step S202. Perform image processing on any one or more frames of images in the target video by using the image processing method in the foregoing embodiment. In other words, each of one or more frames of the target video is used as the target image to obtain processed images corresponding to the one or more frames of the target video.

Specifically, frames of the target video are decoded first, to obtain a plurality of frames of images, then image beautifying processing is performed on the obtained images by using the image processing method described in the foregoing embodiment, to obtain beautified images corresponding to the images, and finally the beautified images are combined to obtain a beautified video.

In the step of the image beautifying processing on the image, beautifying processing may be performed on all images obtained by decoding frames or some of all images obtained by decoding frames. If beautifying processing is performed only on some all images obtained by decoding frames, the beautifying processing may be performed only on images with a set number of frames at intervals. For example, after beautifying processing is performed on a frame of an image, beautifying processing is performed on the sixth frame of images close to the frame, or beautifying processing is performed on an image with a set number of frames per time unit, for example, the beautifying processing is performed on 20 frames of images in 1 second. Performing the beautifying processing only on some images not only can ensure the beautifying effect of the video, but also can further reduce the computation of the beautifying processing and reduce the CPU usage in the video beautifying processing process.

Step S203. Generate a processed video corresponding to the target video based on the processed images.

Specifically, the multi-frame beautified image obtained in step S202 is combined to obtain the beautified video.

In the solution provided in this embodiment of the present disclosure, an image obtained by decoding frames of the target video is used as the target image, and in the process of beautifying the target image, blurring processing and high pass processing are performed on the original image of the specified channel of a plurality of channels of the target image sequentially, a processed high pass image of the specified channel is used as a high pass image of all channels, and then a blurred image of all channels is obtained according to the high pass image. Because there is no image format conversion in the beautifying process in the solution, and blurring processing and high pass processing are performed on images of one channel, the complexity of the beautifying processing is reduced, and the CPU usage of the beautifying processing is further reduced, thereby ensuring that the beautifying processing process in the video conference does not cause an obstacle to other functions.

Figure 3:
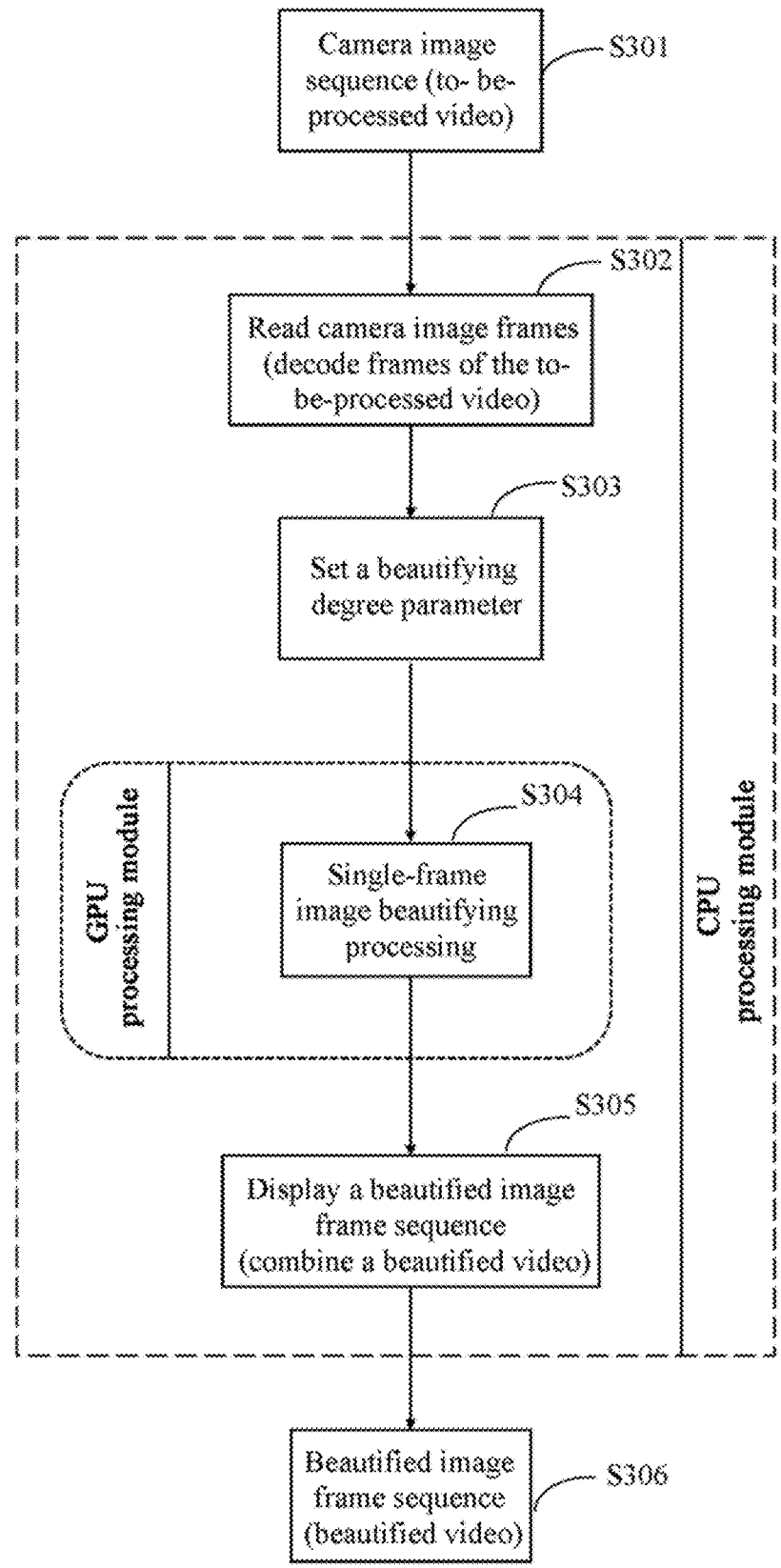
FIG. 3 is an example of video beautifying processing on a desktop terminal in an embodiment of the present disclosure.

To further reduce the CPU usage of the beautifying processing process, a GPU may be used to perform the main steps of the beautifying processing. For example, FIG. 3 is an example of video beautifying processing on a desktop terminal, where the beautifying processing process may include:

Step S301. The desktop terminal obtains a camera image sequence (a target video, i.e., a to-be-processed video) by a CPU.

Step S302. Decode frames of the camera image sequence to obtain a plurality of frames of images.

Step S303. Set a beautifying degree parameter and send the plurality of frames of target images and the beautifying degree parameter to a GPU.

Step S304. Based on a Metal (or a DirectX) solution, the desktop terminal performs beautifying processing on each of the plurality of frames of target images by using the image beautifying method described in the foregoing embodiment by the GPU, to obtain beautified images corresponding to the plurality of frames of target images, and sends the plurality of frames of beautified images to the CPU.

Step S305. The desktop terminal combines the plurality of frames of beautified image by the CPU to obtain a beautified image frame sequence (that is, a beautified video).

Step S306. Output the beautified video.

Among the three steps in the example, (2) is the core step of the beautifying processing, and the GPU is used to perform the step, while the CPU only performs the two steps of (1) and (3) for video frame decoding and combination, which greatly reduces the CPU usage of the whole video beautifying processing. Further, the foregoing three steps may alternatively be performed entirely by the GPU, making the CPU usage of the video beautifying processing close to 0.

Because a parallel computing capability of the GPU is stronger than that of the CPU, the foregoing processing process is improved in this embodiment of the present disclosure. That is, the terminal can invoke an image processing interface provided in the GPU, such as Metal or DirectX, to transfer the foregoing step (2) to the GPU for implementation. Accordingly, the terminal can also invoke an image processing interface of the GPU. The image processing interface is used for parallel performing spatial filtering of releasing pixel dependency on the pixels in a target image in a target video, and parallel obtaining each pixel in the target image in the target video, thereby parallel processing the pixels in the target image in the target video, and accelerating the entire image processing process. In addition, CPU resources are saved and the CPU usage is reduced.

In one embodiment of the present disclosure, the obtaining a target video includes:

obtaining a conference video captured by using a video capture device; and after obtaining a processed video as a beautified video, the method further includes:

transmitting the processed video to a video receiver in a video conference.

Specifically, in a video conference scenario, the target video is the conference video captured by using the video capture device, and after the conference video is beautified, a local terminal device may display the beautified conference video, and also send the beautified conference video to the video receiver and display the video.

The solution of this embodiment of the present disclosure is further described below by using several examples:

In an example, as shown in FIG. 4, a local terminal device is a PC with a camera. After a video conference is started, the camera of the PC captures a video including a local user face, and the PC performs beautifying processing on the captured video to obtain a beautified video, and displays the beautified video through a display. Meanwhile, the PC uses an encoder to encode the beautified video and sends the encoded beautified video to remote devices in the video conference. After receiving the encoded beautified video, a cloud device uses a decoder to decode the encoded beautified video to obtain the beautified video and sends the video to remote users for displaying.

In another example, referring to FIG. 5A, FIG. 5B, FIG. 6A, and FIG. 6B, FIG. 5A shows a frame of an original image in a conference video captured by a PC, and FIG. 5B shows a beautified image corresponding to the original image in FIG. 5A, where the box in FIG. 5A and the box in FIG. 5B show the same region of a face. FIG. 6A shows an enlarged image of the region in the box in FIG. 5A, and FIG. 6B shows an enlarged image of the region in the box in FIG. 5B. As can be seen through comparison between FIG. 6B and FIG. 6A, acne marks on the face in the beautified image are significantly less than those in the original image.

In another example, different brands of PCs are used to perform the video beautifying solution in a video conference in this embodiment of the present disclosure, and CPU usages corresponding to the brands are shown in Table 1.

TABLE 1

| PC Brand | CPU usage of video beautifying algorithm |
|---|---|
| Brand 1 | 1.65% |
| Brand 2 | 0.65% |

As can be seen from data in Table 1, the CPU usage of the algorithm is quite low for both brands of PCs when the video beautifying algorithm provided in this embodiment of the present disclosure is performed. Therefore, the beautifying algorithm provided in this embodiment of the present disclosure has a quite small obstacle to other functions in the video conference.

Figure 7:
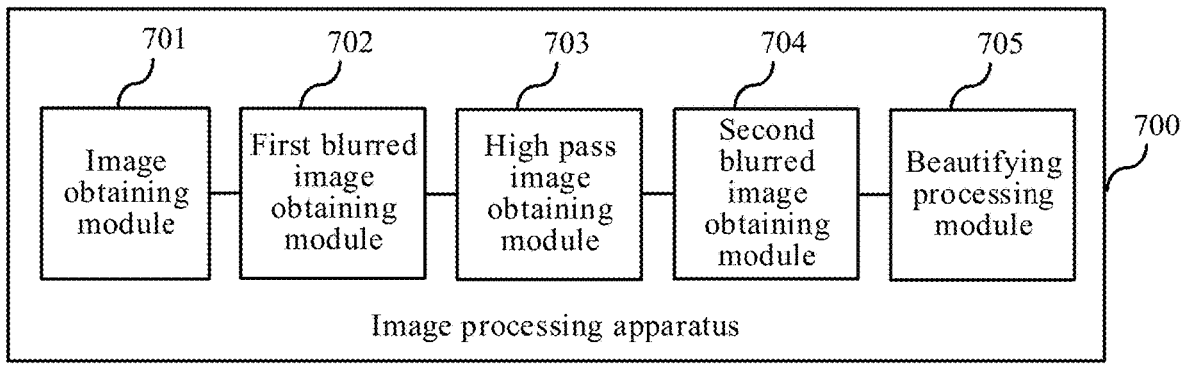
FIG. 7 is a structural block diagram of an image processing apparatus according to an embodiment of the present disclosure.

FIG. 7 is a structural block diagram of an image processing apparatus according to an embodiment of the present disclosure. The apparatus 700 may include: an image obtaining module 701, a first blurred image obtaining module 702, a high pass image obtaining module 703, a second blurred image obtaining module 704, and a beautifying processing module 705.

The image obtaining module 701 is configured to obtain a target image.

The first blurred image obtaining module 702 is configured to perform blurring on an original image of a specified channel of channels of the target image to obtain a first blurred image.

The high pass image obtaining module 703 is configured to perform high pass processing on the original image of the specified channel and the first blurred image to obtain a high pass image.

The second blurred image obtaining module 704 is configured to obtain, for a channel, a second blurred image corresponding to the channel based on an original image of the channel and the high pass image.

The beautifying processing module 705 is configured to obtain a processed image corresponding to the target image based on the second blurred image of the channel and the high pass image.

In the solution provided in this embodiment of the present disclosure, in the process of beautifying the target image, blurring processing and high pass processing are performed on the original image of the specified channel of a plurality of channels of the target image sequentially, a processed high pass image of the specified channel is used as the high pass image of all channels, and then a blurred image of all channels is obtained according to the high pass image. Because there is no image format conversion in the beautifying process in the solution, and blurring processing and high pass processing are performed on images of only one channel, the complexity of the beautifying processing is reduced, and the CPU usage of the beautifying processing is further reduced.

In one embodiment of the present disclosure, the first blurred image obtaining module is further configured to:
perform the following processing for a pixel in the original image of the specified channel: obtain a first preset quantity of pixels within a region having a preset radius centered on the pixel, the first preset quantity being less than a quantity of pixels within the region; and obtain a blurred pixel value corresponding to the pixel based on pixel values of the pixels of the first preset quantity to
obtain the first blurred image according to the blurred pixel value corresponding to the pixel in the original image.

In one embodiment of the present disclosure, the obtaining pixel values of pixels of a first preset quantity within a preset radius includes: drawing a plurality of circles within the region, and obtaining a plurality of pixels symmetrically distributed on one or more of the plurality of circles, wherein a total quantity of pixels obtained from the one or more circles is the first preset quantity.

In one embodiment of the present disclosure, the high pass image obtaining module is further configured to:
obtain an initial high pass image based on differences between pixel values of pixels in the original image of the specified channel and pixel values of corresponding pixels in the first blurred image; and
perform at least one high pass filtering processing on the initial high pass image to obtain the high pass image.

In one embodiment of the present disclosure, the second blurred image obtaining module is further configured to:
obtain blurred image retention parameters based on the first blurred image, the blurred image retention parameters being used for representing information distribution corresponding to pixels in the first blurred image;
obtain a third blurred image corresponding to the channel based on differences between pixel values of pixels in the original image of the channel and pixel values of corresponding pixels in the high pass image; and
obtain the second blurred image based on the blurred image retention parameters and the third blurred image.

In one embodiment of the present disclosure, the obtaining blurred image retention parameters based on the first blurred image includes:
determining the blurred image retention parameter according to the following expression:

$I_\alpha = 1.0 + (I_g^G)^\beta * \omega$, where $I_g^G$ is a pixel value of a pixel in the first blurred image corresponding to the specified channel, $I_\alpha$ is blurred image retention parameters of the pixel, and $\beta$ and $\omega$ are adjustment coefficients.

In one embodiment of the present disclosure, the beautifying processing module is further configured to:
add pixel values of the pixels in the second blurred image corresponding to channels of the target image to pixel values of corresponding pixels in the high pass image, to obtain an added image; and
perform weighted summation on pixel values of pixels in the added image and the pixel values of the corresponding pixels in the target image to obtain the processed image.

In one embodiment of the present disclosure, the channels of the target image are red, green, and blue (RGB) channels, and the specified channel is a G channel.

Figure 8:
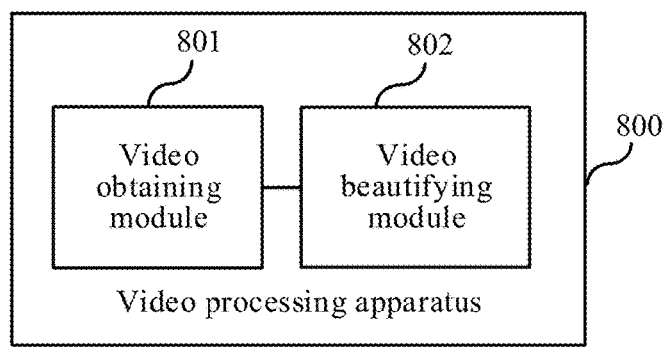
FIG. 8 is a structural block diagram of a video processing apparatus according to an embodiment of the present disclosure.

FIG. 8 is a structural block diagram of a video processing apparatus according to an embodiment of the present disclosure. The apparatus 800 may include: a video obtaining module 801 and a video beautifying module 802.

The video obtaining module 801 is configured to obtain a target video.

The video beautifying module 802 is configured to perform image processing on any one or more frames of images in the target video by using the image processing method in the foregoing embodiment; and generate a processed video corresponding to the target video based on the processed images.

In the solution provided in this embodiment of the present disclosure, an image obtained by decoding frames of the target video is used as the target image, and in the process of beautifying the target image, blurring processing and high pass processing are performed on the original image of the specified channel of a plurality of channels of the target image sequentially, a processed high pass image of the specified channel is used as a high pass image of all channels, and then a blurred image of all channels is obtained according to the high pass image. Because there is no image format conversion in the beautifying process in the solution, and blurring processing and high pass processing are performed on images of one channel, the complexity of the beautifying processing is reduced, and the CPU usage of the beautifying processing is further reduced, thereby ensuring that the beautifying processing process in the video conference does not cause an obstacle to other functions.

In one embodiment of the present disclosure, the video obtaining module is further configured to:
obtain a conference video captured by using a video capture device.

The apparatus may further include a video transmission module, configured to:
transmit the processed video to a video receiver in a video conference.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Based on the same principle, an embodiment of the present disclosure further provides an electronic device, including a memory, a processor and a computer program stored in the memory and runnable on the processor. When executing the computer program, the processor performs the method according to any optional embodiment of the present disclosure, which can be specifically implemented in the following cases:

Case 1: obtain a target image; perform blurring processing on an original image of a specified channel of channels of the target image to obtain a first blurred image; perform high pass processing on the original image of the specified channel and the first blurred image to obtain a high pass image; obtain, for a channel, a second blurred image corresponding to the channel based on an original image of the channel and the high pass image; and obtain a processed image corresponding to the target image based on the second blurred image of the channel and the high pass image.

Case 2: obtain a target video; and perform image processing on the target video by using the image processing method in the foregoing embodiment, to obtain a processed video corresponding to the target video.

An embodiment of the present disclosure provides a computer-readable storage medium, storing a computer program, the computer program, when executed by a processor, implementing the method according to any embodiment of the present disclosure.

It may be understood that the medium may store a computer program corresponding to the image processing method or the video processing method.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 9:
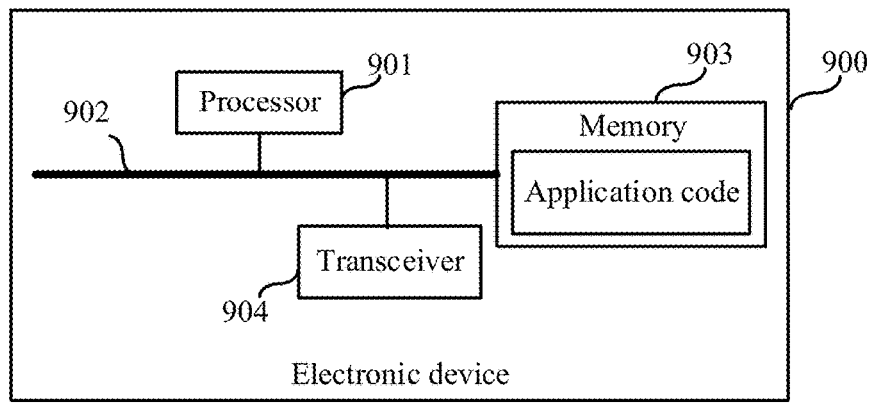
FIG. 9 is a schematic structural diagram of an electronic device according to an embodiment of the present disclosure.

FIG. 9 is a schematic structural diagram of an electronic device according to an embodiment of the present disclosure. As shown in FIG. 9, the electronic device 900 includes: a processor 901 and a memory 903. The processor 901 and the memory 903 are connected, for example, through a bus 902. Further, the electronic device 900 may further include a transceiver 904, and the electronic device 900 may exchange data with other electronic devices through the transceiver 904. In actual application, there may be one or more transceivers 904. The structure of the electronic device 900 does not constitute a limitation to this embodiment of the present disclosure.

The processor 901 is applied to the embodiments of the present disclosure, and may be configured to implement the functions of the image obtaining module, the first blurred image obtaining module, the high pass image obtaining module, the second blurred image obtaining module, and the beautifying processing module shown in FIG. 7, or implement the functions of the video obtaining module and the video beautifying module shown in FIG. 8.

The processor 901 may be a CPU, a general-purpose processor, a DSP, an ASIC, an FPGA or another programmable logic device, a transistor logic device, a hardware component, or any combination thereof. The processor 901 may implement or perform various examples of logic blocks, modules, and circuits described with reference to content disclosed in the present disclosure. The processor 901 may alternatively be a combination to implement a computing function, for example, may be a combination of one or more microprocessors, or a combination of a DSP and a microprocessor.

The bus 902 may include a channel, to transmit information between the foregoing components. The bus 902 may be a PCI bus, an EISA bus, or the like. The bus 902 may be classified into an address bus, a data bus, a control bus, and the like. For ease of description, the bus in FIG. 9 is represented by using only one bold line, but this does not indicate that there is only one bus or one type of bus.

The memory 903 may be a ROM or another type of static storage device that can store static information and a static instruction; or a RAM or another type of dynamic storage device that can store information and an instruction; or may be an EEPROM, a CD-ROM or another compact-disc storage medium, optical disc storage medium (including a compact disc, a laser disk, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto.

The memory 903 is configured to store application code for performing the solutions of the present disclosure, and is controlled and executed by the processor 901. The processor 901 is configured to execute the application code stored in the memory 903 to implement actions of the image processing apparatus provided in the embodiment shown in FIG. 7, or to implement actions of the video processing apparatus provided in the embodiment shown in FIG. 8.

It is to be understood that, although the steps in the flowchart in the accompanying drawings are sequentially shown according to indication of an arrow, the steps are not necessarily sequentially performed according to a sequence indicated by the arrow. Unless explicitly specified in this specification, execution of the steps is not strictly limited in the sequence, and the steps may be performed in other sequences. In addition, at least some steps in the flowcharts in the accompanying drawings may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

The foregoing descriptions are some implementations of the present disclosure. A person of ordinary skill in the art may make several improvements and refinements without departing from the principle of the present disclosure, and the improvements and refinements shall fall within the protection scope of the present disclosure.

What is claimed is:

1. An image processing method, performed by an electronic device, the method comprising:
   obtaining a target image;
   performing blurring processing on an original image of a specified channel of channels of the target image to obtain a first blurred image;

performing high pass processing on the original image of the specified channel and the first blurred image to obtain a high pass image;

obtaining, for each channel of the channels of the target image, a second blurred image corresponding to the channel based on an original image of the channel and the high pass image; and obtaining a processed image corresponding to the target image based on the second blurred images of the channels and the high pass image, comprising:

adding pixel values of pixels in the high pass image to pixel values of the corresponding pixels in the second blurred images of the channels to obtain an added image, the added image having the same channels as the target image; and performing weighted summation on pixel values of pixels in the added image and the pixel values of the corresponding pixels in the target image to obtain the processed image.

2. The method according to claim 1, wherein the performing blurring processing on an original image of a specified channel of channels of the target image to obtain a first blurred image comprises:

for a pixel in the original image of the specified channel:
obtaining a first preset quantity of pixels within a region having a preset radius centered on the pixel, the first preset quantity being less than a quantity of pixels within the region; and
obtaining a blurred pixel value corresponding to the pixel based on pixel values of the pixels of the first preset quantity; and
obtaining the first blurred image according to the blurred pixel value corresponding to the pixel in the original image.

3. The method according to claim 2, wherein the obtaining pixel values of a first preset quantity of pixels within a region comprises:

drawing a plurality of circles within the region;
obtaining a plurality of pixels symmetrically distributed on one or more of the plurality of circles, wherein a total quantity of pixels obtained from the one or more circles is the first preset quantity.

4. The method according to claim 1, wherein the performing high pass processing on the original image of the specified channel and the first blurred image to obtain a high pass image comprises:

obtaining an initial high pass image based on differences between pixel values of pixels in the original image of the specified channel and pixel values of corresponding pixels in the first blurred image; and
performing at least one high pass filtering processing on the initial high pass image to obtain the high pass image.

5. The method according to claim 1, wherein the obtaining, for each channel of the channels of the target image, a second blurred image corresponding to the channel based on an original image of the channel and the high pass image comprises:

obtaining blurred image retention parameters based on the first blurred image, the blurred image retention parameters representing information distribution corresponding to pixels in the first blurred image;
for each channel:
obtaining a third blurred image corresponding to the channel based on differences between pixel values of pixels in the original image of the channel and pixel values of corresponding pixels in the high pass image; and
obtaining the second blurred image based on the blurred image retention parameters and the third blurred image.

6. The method according to claim 5, wherein the obtaining blurred image retention parameters based on the first blurred image comprises:

determining, for a pixel in the first blurred image, a blurred image retention parameter according to $\beta$ power of a pixel value of the pixel in the first blurred image, $\beta$ being an adjustment coefficient.

7. The method according to claim 1, wherein the channels of the target image include a red channel, a green channel, and a blue channel, and the specified channel is the green channel.

8. The method according to claim 1, further comprising:
obtaining a target video;
using one or more frames of the target video as the target image, to obtain processed images corresponding to the one or more frames of the target video; and
generating a processed video corresponding to the target video based on the processed images.

9. The method according to claim 8, wherein the obtaining a target video comprises:
obtaining a conference video captured by using a video capture device; and
the method further comprises:
transmitting the processed video to a video receiver in a video conference.

10. An image processing apparatus, comprising:
a memory and a processor,
the memory storing a computer program; and
the processor being configured to execute the computer program to:
obtain a target image;
perform blurring on an original image of a specified channel of channels of the target image to obtain a first blurred image;
perform high pass processing on the original image of the specified channel and the first blurred image to obtain a high pass image;
obtain, for each channel of the channels of the target image, a second blurred image corresponding to the channel based on an original image of the channel and the high pass image; and
obtain a processed image corresponding to the target image based on the second blurred images of the channels and the high pass image, comprising:
adding pixel values of pixels in the high pass image to pixel values of the corresponding pixels in the second blurred images of the channels to obtain an added image, the added image having the same channels as the target image; and
performing weighted summation on pixel values of pixels in the added image and the pixel values of the corresponding pixels in the target image to obtain the processed image.

11. The apparatus according to claim 10, wherein the processor is further configured to:
for a pixel in the original image of the specified channel:
obtain a first preset quantity of pixels within a region having a preset radius centered on the pixel, the first preset quantity being less than a quantity of pixels within the region; and obtain a blurred pixel value corresponding to the pixel based on pixel values of the pixels of the first preset quantity; and obtain the first blurred image according to the blurred pixel value corresponding to the pixel in the original image.

12. The apparatus according to claim 11, wherein the processor is further configured to:

draw a plurality of circles within the region;

obtain a plurality of pixels symmetrically distributed on one or more of the plurality of circles, wherein a total quantity of pixels obtained from the one or more circles is the first preset quantity.

13. The apparatus according to claim 10, wherein the processor is further configured to:

obtain an initial high pass image based on differences between pixel values of pixels in the original image of the specified channel and pixel values of corresponding pixels in the first blurred image; and perform at least one high pass filtering processing on the initial high pass image to obtain the high pass image.

14. The apparatus according to claim 10, wherein the processor is further configured to:

obtain blurred image retention parameters based on the first blurred image, the blurred image retention parameters representing information distribution corresponding to pixels in the first blurred image;

for each channel:

obtain a third blurred image corresponding to the channel based on differences between pixel values of pixels in the original image of the channel and pixel values of corresponding pixels in the high pass image; and obtain the second blurred image based on the blurred image retention parameters and the third blurred image.

15. The apparatus according to claim 10, wherein the channels of the target image include a red channel, a green channel, and a blue channel, and the specified channel is the green channel.

16. The apparatus according to claim 10, wherein the processor is further configured to:

obtain a target video; and use each of one or more frames of the target video as the target image, to obtain processed images corresponding to the one or more frames of the target video; and; and generate a processed video corresponding to the target video based on the processed images.

17. The apparatus according to claim 16, wherein the processor is configured to obtain a conference video captured by using a video capture device; and transmit the processed video to a video receiver in a video conference.

18. A non-transitory computer-readable storage medium, storing a computer program, the computer program, when executed by a processor, cause the processor to implement:

obtaining a target image;

performing blurring processing on an original image of a specified channel of channels of the target image to obtain a first blurred image;

performing high pass processing on the original image of the specified channel and the first blurred image to obtain a high pass image;

obtaining, for each channel of the channels of the target image, a second blurred image corresponding to the channel based on an original image of the channel and the high pass image; and obtaining a processed image corresponding to the target image based on the second blurred images of the channels and the high pass image, comprising:

adding pixel values of pixels in the high pass image to pixel values of the corresponding pixels in the second blurred images of the channels to obtain an added image, the added image having the same channels as the target image; and performing weighted summation on pixel values of pixels in the added image and the pixel values of the corresponding pixels in the target image to obtain the processed image.

* * * * *